US012565318B2

(12) United States Patent
Kuyper et al.

(10) Patent No.: US 12,565,318 B2
(45) Date of Patent: Mar. 3, 2026

(54) PASSENGER SEATING UNIT WITH HALF SHELL SURROUND

(71) Applicant: B/E Aerospace, Inc., Winston-Salem, NC (US)

(72) Inventors: John R. Kuyper, Winston-Salem, NC (US); David J. Poole, Winston-Salem, NC (US); Jeremy R. Loman, Lexington, NC (US); Javier Valdes de la Garza, Winston-Salem, NC (US); Ryan J. Suhre, Winston-Salem, NC (US); Martin Darbyshire, London (GB); Lawrie Bellwood, London (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 185 days.

(21) Appl. No.: 18/422,530

(22) Filed: Jan. 25, 2024

(65) Prior Publication Data

US 2025/0242920 A1    Jul. 31, 2025

(51) Int. Cl.
B64D 11/06 (2006.01)
B60N 2/68 (2006.01)

(52) U.S. Cl.
CPC ........ B64D 11/064 (2014.12); B64D 11/0648 (2014.12); B60N 2/68 (2013.01); B60N 2/682 (2013.01); B60N 2/686 (2013.01); B64D 11/0638 (2014.12)

(58) Field of Classification Search
CPC .............. B64D 11/064; B64D 11/0648; B64D 11/0638; B64D 11/06; B60N 2/68; B60N 2/682; B60N 2/686
See application file for complete search history.

(56) References Cited

U.S. PATENT DOCUMENTS

| | | | |
|---|---|---|---|
| 6,059,364 A | 5/2000 | Dryburgh et al. | |
| 6,113,183 A | 9/2000 | Koch et al. | |
| 6,672,661 B2 | 1/2004 | Williamson | |
| 6,742,840 B2 * | 6/2004 | Bentley ................. B60N 2/995 | 297/316 |
| 6,742,842 B2 | 6/2004 | Dowty | |
| 10,787,261 B2 | 9/2020 | Clucas et al. | |

(Continued)

FOREIGN PATENT DOCUMENTS

EP        2878481 A1    6/2015

OTHER PUBLICATIONS

European Patent Office, Extended European Search Report received in EP Application No. 25153823.7, Mar. 17, 2025, 6 pages.

(Continued)

*Primary Examiner* — Syed A Islam
(74) *Attorney, Agent, or Firm* — Suiter Swantz IP

(57) ABSTRACT

A passenger seat assembly for installation in a conveyance such as an aircraft. The passenger seat assembly includes at least one passenger seat supported by a frame assembly, a footwell positioned below the at least one passenger seat, and a fixed shell mounted to the back of the frame assembly. The fixed shell extends across the back of the passenger seat assembly, and extends from the footwell space upward to about armrest height. In use, the fixed shell closes out a portion of the back of the passenger seat assembly to provide protection for surrounding passengers as the at least one passenger seat adjusts between upright and reclined.

16 Claims, 9 Drawing Sheets

(56) References Cited

U.S. PATENT DOCUMENTS

| | | | | |
|---|---|---|---|---|
| 11,780,588 B2 * | 10/2023 | Jensen | ................... | B60N 3/004 |
| | | | | 297/146 |
| 2006/0284465 A1 | 12/2006 | Schweizer et al. | | |
| 2017/0021930 A1 | 1/2017 | Henshaw | | |
| 2021/0179274 A1 | 6/2021 | Lueck et al. | | |

OTHER PUBLICATIONS

Nikkytok, iStock, "Airline Passenger Seat," Feb. 7, 2019, 1 page.

* cited by examiner

PASSENGER SEATING UNIT WITH HALF SHELL SURROUND

TECHNICAL FIELD AND BACKGROUND

The present disclosure relates generally to passenger seating in an aircraft or other conveyance, and more particularly, to passenger seat assemblies equipped with a fixed half shell positioned on the backside of the assemblies for protecting surrounding passengers from moving seat components.

Passenger seats in aircraft and other conveyances may vary depending on the seating class. For example, economy class seats may be grouped into closely spaced rows to maximize seating density, whereas business class seats may be spaced farther apart to maximize privacy and comfort. The relatively short seat pitch found in economy classes greatly limits the adjustment capabilities of the seat. As a result, economy class seats typically lack a leg rest, include a fixed seat bottom, and include a seat back with limited recline capability. The comparatively greater seat pitch found in business seating classes allows for highly adjustable seats. As a result, some business class seats can be equipped with a leg rest, and in some cases include a backrest configured to transition to horizontal to form a bed.

In some applications, to find a balance between seating density, comfort, and privacy, it would be desirable to provide a seat that could be grouped into rows that has an adjustability between shallow recline and lie flat. For example, a desirable seat may include one with synchronous seat bottom and seat back motion to provide a cradle recline sitting position during flight. Such a seat would require moving parts that not only rotate, but may also translate. Moving components can present a danger to other passengers, and particularly those sitting within reach of the moving components. Therefore, not only is a more highly-adjustable seat desired, but also one that protects other passengers from moving seat components.

BRIEF SUMMARY

In one aspect, embodiments of the inventive concepts disclosed herein are directed to a passenger seat assembly including at least one passenger seat including a seat bottom and a seat back coupled for synchronous motion between an upright sitting position and a reclined sitting position, and the at least one passenger seat including at least one armrest. The assembly further includes a frame assembly supporting the at least one passenger seat, the frame assembly including spaced lateral spreaders and at least one transverse beam, and the frame assembly defining footwell space below the transverse beam. The assembly further includes a fixed shell subassembly including a frame member attached to the spaced lateral spreaders, the frame member extending horizontally across a back of the passenger seat assembly, and a fixed shell attached to and overlying the frame member, the fixed shell extending horizontally across the back of the passenger seat assembly, and the fixed shell extending vertically from a position above the footwell space to a position at about armrest height.

In some embodiments, the passenger seat assembly further includes an end bay positioned at each lateral side of the at least one passenger seat, and the fixed shell extends vertically between an upper transverse plane substantially aligned with a top of each of the end bays, and a lower transverse plane positioned above the footwell space.

In some embodiments, the frame member is positioned below the upper transverse plane and above the lower transverse plane.

In some embodiments, the end bays and the fixed shell form a closeout extending substantially continuously across the back and lateral sides of the passenger seat assembly.

In some embodiments, the seat back includes an upper portion and a lower portion angled relative to the upper portion, the fixed shell is inclined, and when the passenger seat is in the upright sitting position, the lower portion and the fixed shell are substantially parallel.

In some embodiments, a juncture of the upper portion and the lower portion is at all times positioned above a top of the fixed shell.

In some embodiments, the passenger seat assembly further includes at least one passenger amenity mounted to a back of the fixed shell for use by a passenger seated in an aft passenger seat facing the fixed shell.

According to another aspect, the inventive concepts disclosed herein are directed to a passenger seating unit including at least two passenger seats positioned side by side, a frame assembly supporting the at least two passenger seats and defining a footwell space, and a fixed shell subassembly. In embodiments, the fixed shell subassembly includes a frame member attached to the spreaders and extending horizontally across a back of the passenger seating unit, and a fixed shell attached to and overlying the frame member. In embodiments, the fixed shell extends horizontally across the back of the passenger seating unit, and vertically from a position above the footwell space to about armrest height.

In some embodiments, the passenger seating unit further includes an end bay positioned at each lateral side of the passenger seating unit, wherein each end bay is associated with an armrest, for instance a vertically adjustable armrest housed within the end bay.

In some embodiments, the frame member attaches to a back of the spreaders, and the frame member is positioned below the upper transverse plane and above the lower transverse plane.

In some embodiments, the seat bottom and the seat back are coupled for synchronous motion wherein, as the passenger seat transitions from the upright sitting position to the reclined sitting position, a pivotal coupling of the seat back and the seat bottom lowers and moves forward.

According to a further aspect, the inventive concepts disclosed herein are directed to an aircraft passenger seat assembly including a frame assembly attachable to a floor and defining a footwell, at least one passenger seat supported by the frame assembly, and a fixed shell attached to a back of the frame assembly, the fixed shell extending horizontally across the back of the frame assembly and vertically from a position above the footwell to about armrest height. In use, the at least one passenger seat is configured to move between an upright sitting position and a reclined sitting position relative to the fixed shell.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
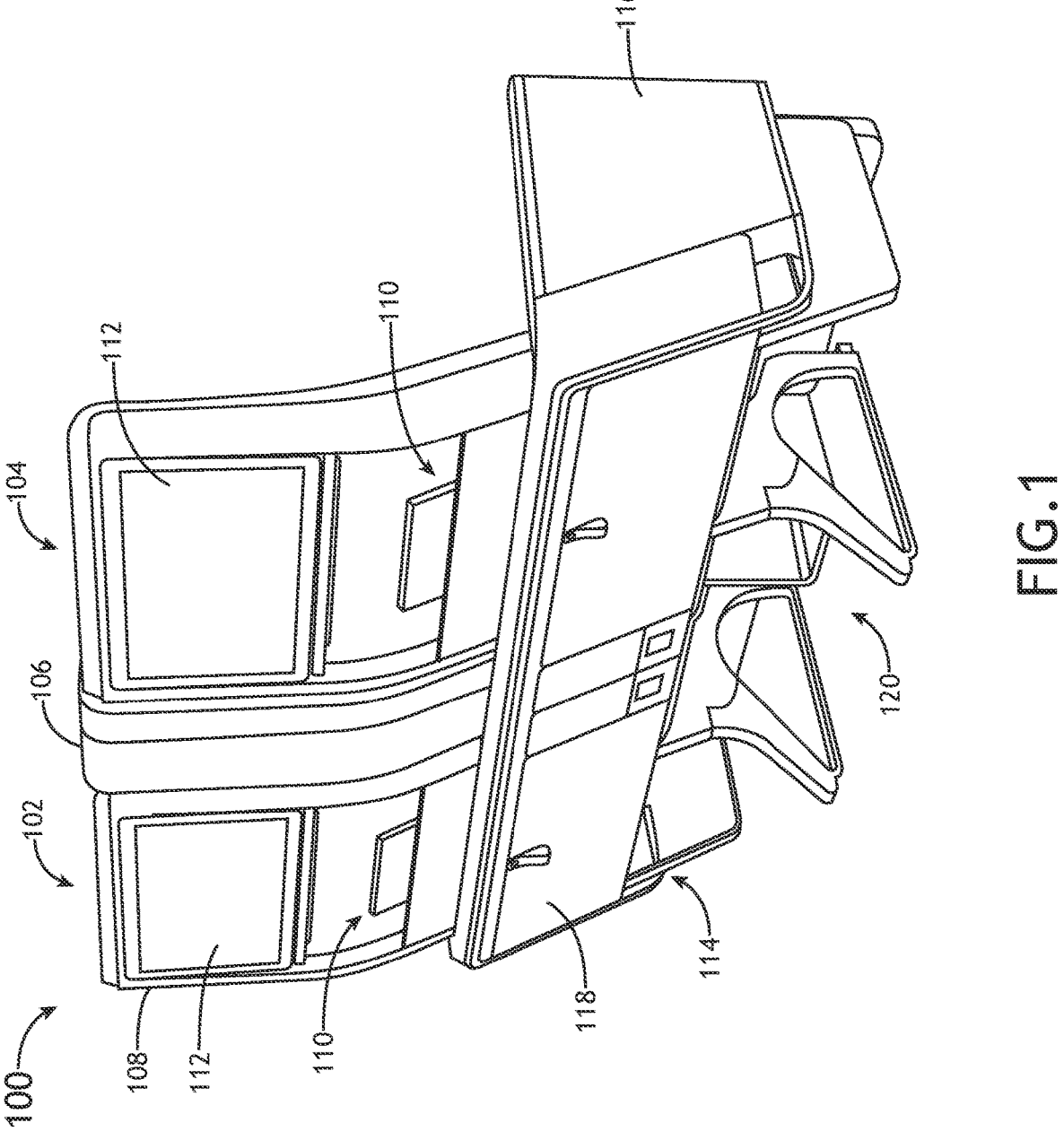
FIG. 1 is a rear perspective view of a passenger seating unit, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to passenger seating for a conveyance such as an aircraft, and more specifically, passenger seat assemblies including an attached 'half shell.' In embodiments, the assemblies include at least one passenger seat configured with a 'deep' or 'cradle' recline capability in which the seat bottom and the seat back are coupled for synchronous motion. In use, each seat is adjustable between an upright sitting position for taxi, takeoff, and landing (TTOL), and a reclined sitting position during flight, and in some cases through various intermediate sitting positions. When transitioning the passenger seat from upright to reclined, the seat bottom and the seat back are coupled and guided along a motion path such that the seat bottom moves forward, and the seat back rotates and lowers closer to the floor. Each passenger seat may or may not include a leg rest which may be separately deployable or synchronized with the motion of the seat bottom and the seat back. The seat bottom may translate or may also rotate as the seat bottom moves forward to increase the inclination of the seat bottom when fully reclined.

The seat assemblies may include shared components and therefore may be assembled as a complete unit for installation, for instance, as a row of passenger seats in a passenger compartment, for instance a business class cabin of an airliner. The seat assemblies may be configured as a seating unit including at least two passenger seats positioned side by side. In some embodiments, the seating unit may include more than two seats positioned side by side. Like seating units may be spaced apart and longitudinally aligned to form rows of like seating units. In a cabin layout, for example, columns of seats rows may be positioned between a fuselage wall and a longitudinal aisle, or between longitudinal aisles depending on the configuration of the aircraft (e.g., widebody versus narrowbody). In embodiments, each seating unit includes a footwell space under the passenger seats, and the seat pitch between adjacent rows is such that passengers in an aft seating unit are able to reach and make use of the footwell formed under the forward seating unit.

To protect the occupants in the aft seating unit from moving seat components in the forward seating unit, and also to provide a finished look for the seating unit, a fixed shell is positioned along the back of the seating unit. In use, the seats recline relative to/within their fixed shell, the fixed shell 'preserves' the footwell space and therefore the legroom of the aft passengers, and the fixed shell prevents the aft passengers from coming into harmful contact with the moving seat components. In some embodiments, the fixed shell serves as a mounting location for amenities for use by passengers in the aft seating unit.

FIG. 1 illustrates a passenger seat assembly configured as a seating unit 100. The seating unit 100 generally includes a first seat 102 and a second seat 104 positioned side by side (e.g., aligned and facing the same direction). A tower 106 positioned between the seats 102, 104 may serve to provide privacy between the passengers, as well serve as a mounting location for amenities as discussed below. Each seat 102, 104 includes a seat back 108. In embodiments, the seat back 108 may include a literature pocket 110 and may serve as a mounting location for an aft-facing video monitor 112. The seating unit 100 further includes lateral end bays 114, 116 positioned at the terminal lateral ends of the seating unit 100, and a fixed shell 118 positioned on the back of the seating unit 100. In embodiments, the lateral end bays 114, 116 may functions as armrests or may house armrests, for instance vertically adjustable armrests.

In embodiments, the fixed shell 118 extends horizontally along the back of the seating unit 100 from end to end, e.g., from one lateral end bay 114 to the other lateral end bay 116. In embodiments, the fixed shell 118 extends vertically from about a top of a footwell 120 formed under the seats 102, 104 to about the top of the lateral end bays 114, 116 (e.g., about armrest height). In this configuration, the fixed shell 118 is continuous across the back of the seating unit 100 and covers a portion of the back of the seating unit 100 above the floor and well below the tops of the seat backs 108. The fixed shell 118 is also referred to herein as a 'half shell' because the fixed shell 118 does not extend all the way from the floor to the top of the seat backs 108. Instead, the fixed shell 118 leaves the footwell 120 open for use, and also much of the seat backs 108 exposed. In embodiments, the vertical extension of the fixed shell 118 is such that the footwell is left open, the seat backs 108 are able to recline slightly aft of the top of the fixed shell 118 when fully reclined. Thus, the fixed shell 118 is positioned to cover the seat components that could be harmful if contacted by the aft passenger(s) as the seats 102, 104 recline.

In embodiments, the lateral end bays 114, 116 and the fixed shell 118 together form a continuous closeout that extends from one lateral side to the other lateral side of the seating unit 100 to provide a finished look to the seating unit 100. In embodiments, the fixed shell 118 may be inclined to substantially match the inclination of the seat backs 108 when the seats 102, 104 are positioned in the upright sitting position.

Figure 2:
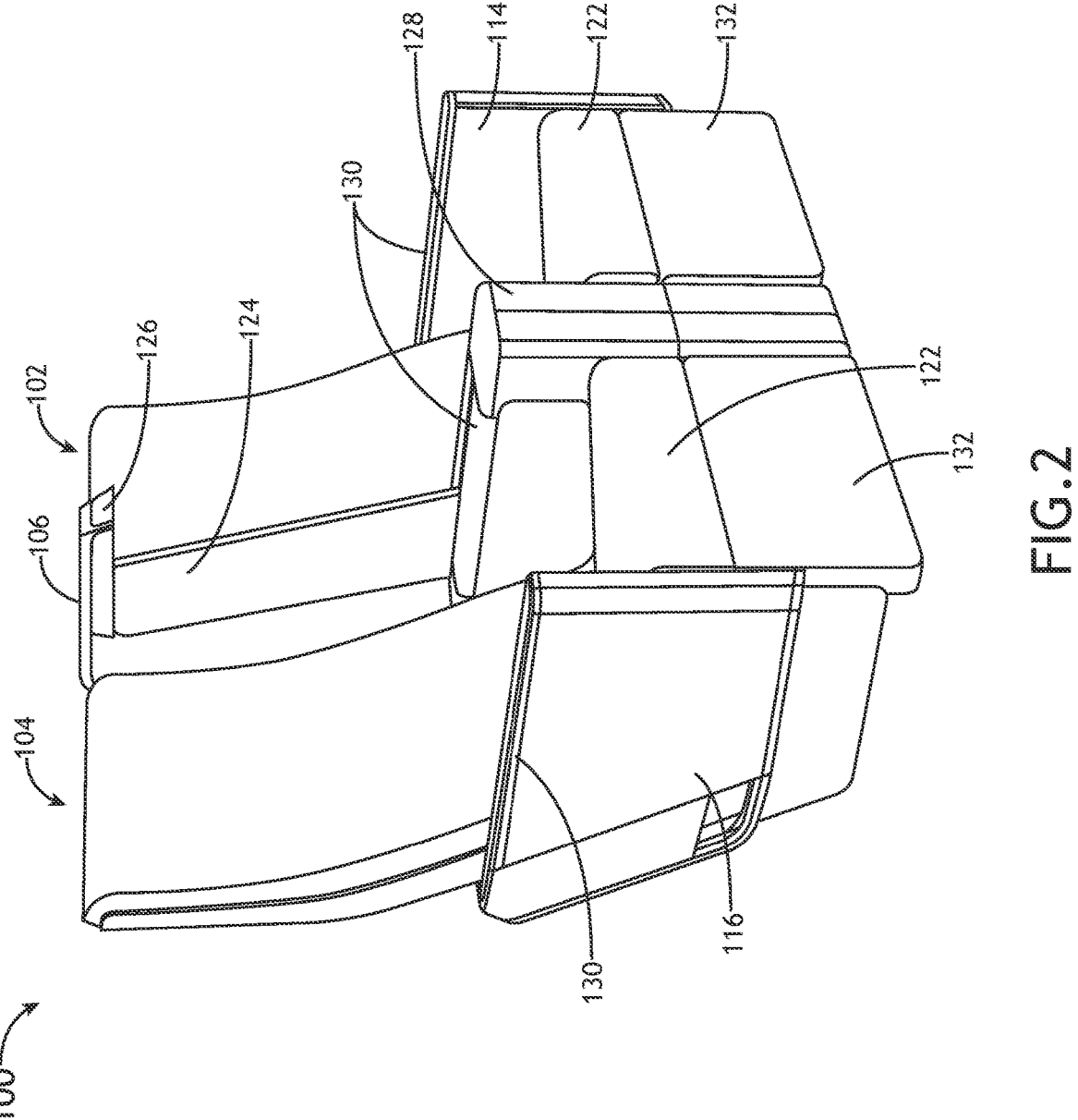
FIG. 2 is front perspective view of the passenger seating unit, in accordance with example embodiments of this disclosure.

FIG. 2 illustrates the seating unit 100 from the front. Each seat 102, 104 further includes a seat bottom 122, the movement of which is discussed below. In some embodiments, the seating unit 100 may include an optional tower 106 that interfaces with the fixed shell 188 and includes a forward extending privacy divider 124 and a hood including, for example, reading lights 126 directed downward. The tower 106 may extend upwardly from a center console 128 positioned between the seats 102, 104. The center console 128 may house two vertically-adjustable armrests 130. The lateral end bays 114, 116 may also house a vertically-adjustable armrest 130. As such, each passenger seat 102, 104 may be provided with two dedicated and vertically-adjustable armrests 130. Each seat 102, 104 may further include a leg rest 132 that may be adjustable separately or synchronously with the recline motion of the seat.

Figure 3:
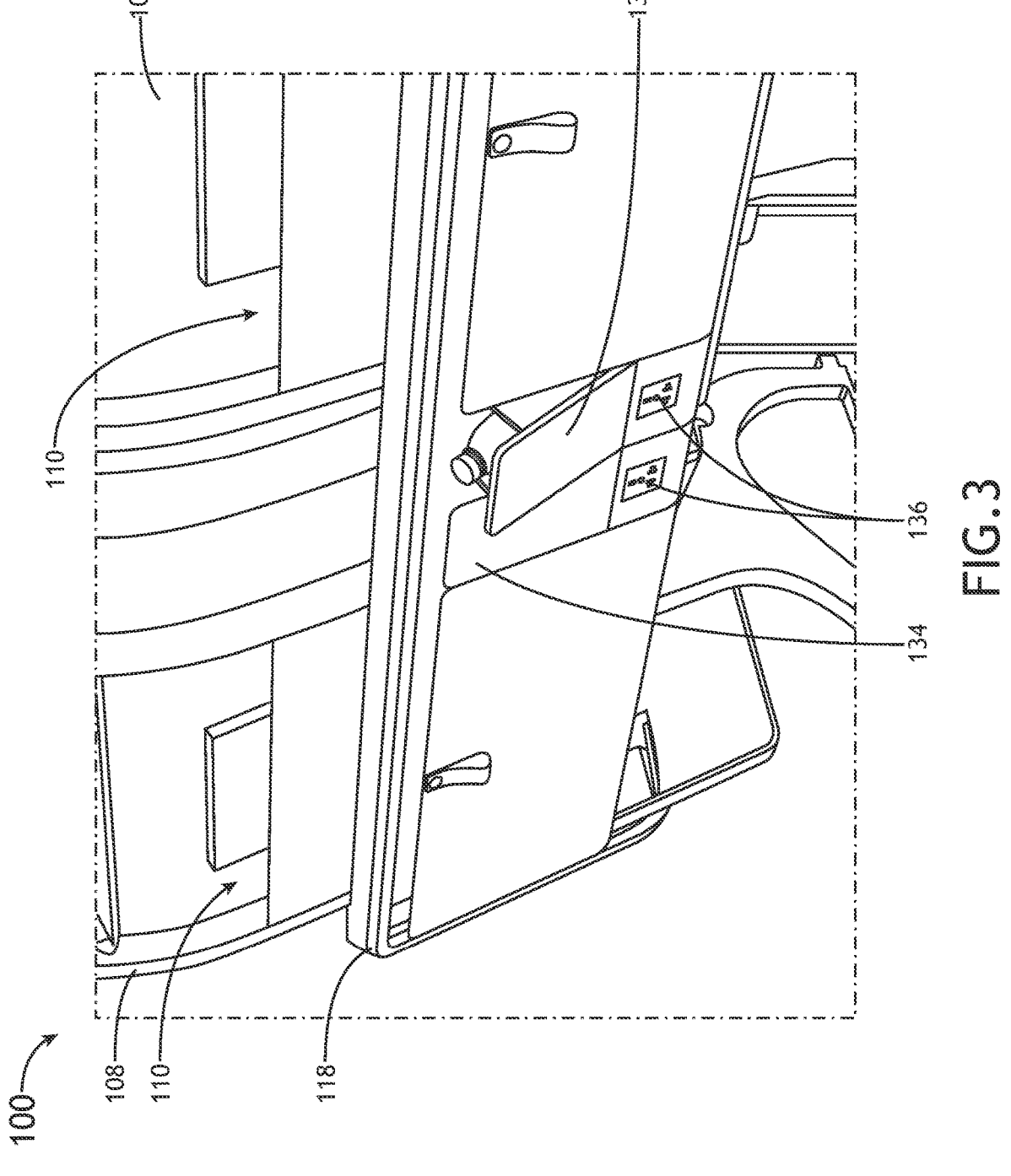
FIG. 3 is detailed view of a portion of the fixed shell illustrating amenities, in accordance with example embodiments of this disclosure.

FIG. 3 illustrates a detailed view of the back of the seating unit 100. In embodiments, the fixed shell 118 may serve as a mounting location for amenities for use by an aft seat passenger. For example, bottle holders 134 may be mounted with the fixed shell 118 and may be configured to move between a stowed condition as shown on the left in the figure, and a deployed condition as shown on the right in the figure. The bottle holder 134 on the right is shown in use holding a beverage container. Two deployable bottle holders 134 may be included to serve two passengers in the next row facing the fixed shell 118. Data and power ports 136, one for each passenger, may be positioned below the bottle holders 134 and out of the way of their deployment. Other amenities can be located to the side of the bottle holders 134 and power ports 136 such as, but not limited to, storage compartments, hanging hooks, etc. The positional relationship of the fixed shell 118 to the seat backs 108 is such that the literature pockets 110 are accessible in each of the upright and fully reclined positions of the seat backs 108.

Figure 4:
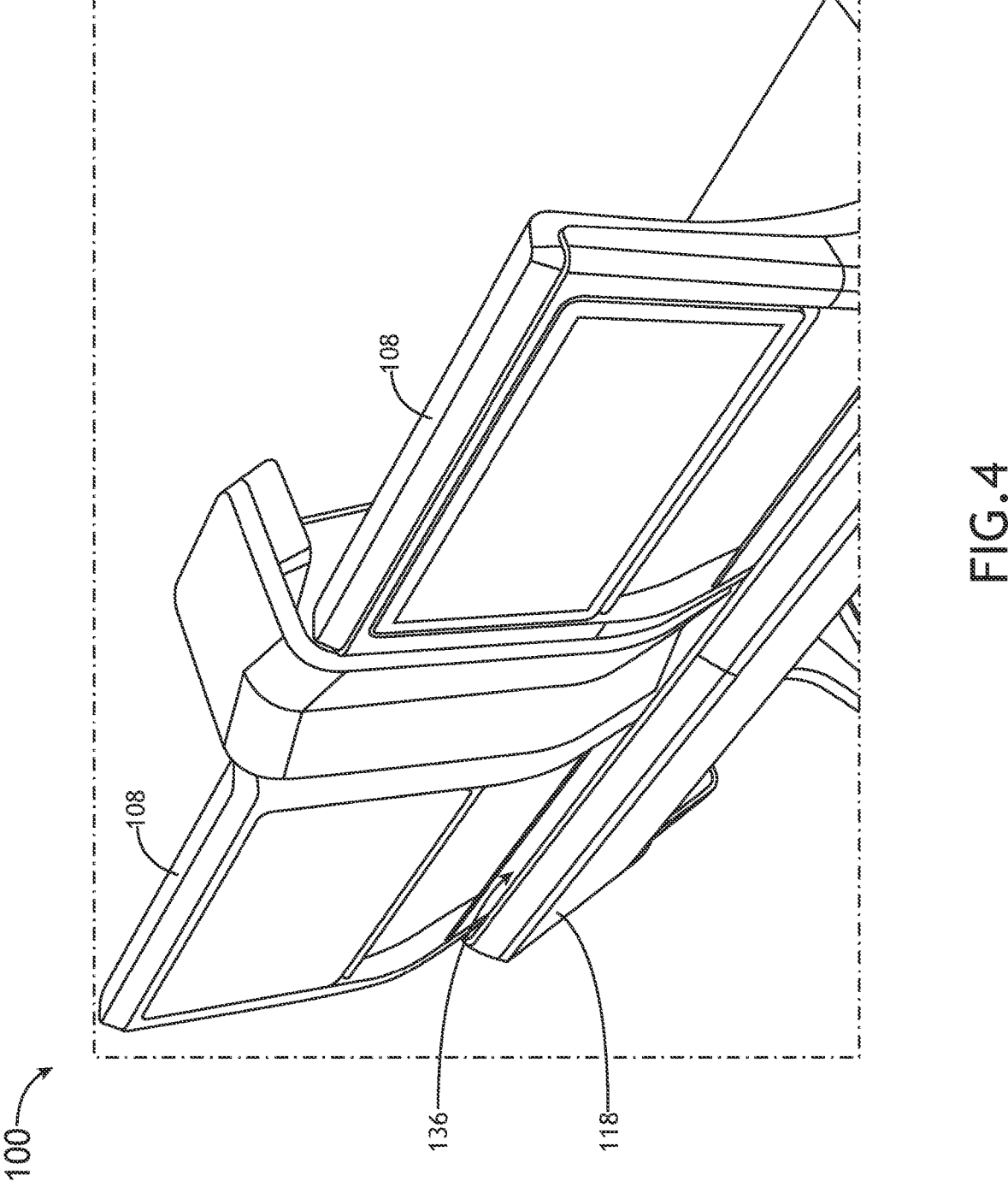
FIG. 4 is a top perspective view of the seating unit illustrating the positional relationship of the seat backs to the filed shell, in accordance with example embodiments of this disclosure.

FIG. 4 illustrates the seating unit 100 from above to show the positional relationship of the reclining seat backs 108 to the fixed shell 118. The seat backs 108 are preferably positioned close to, and in some embodiments may be in contact with, the fixed shell 118 such that a minimal gap 136 is formed. In some embodiments, the gap 136 may be covered with a flexible membrane to prevent objects from collecting and becoming entrapped between the seat backs 108 and the fixed panel 118. In some embodiments, a warning label may be affixed to the fixed panel or elsewhere to inform the passengers of a hazard and possible pinch point.

Figure 5:
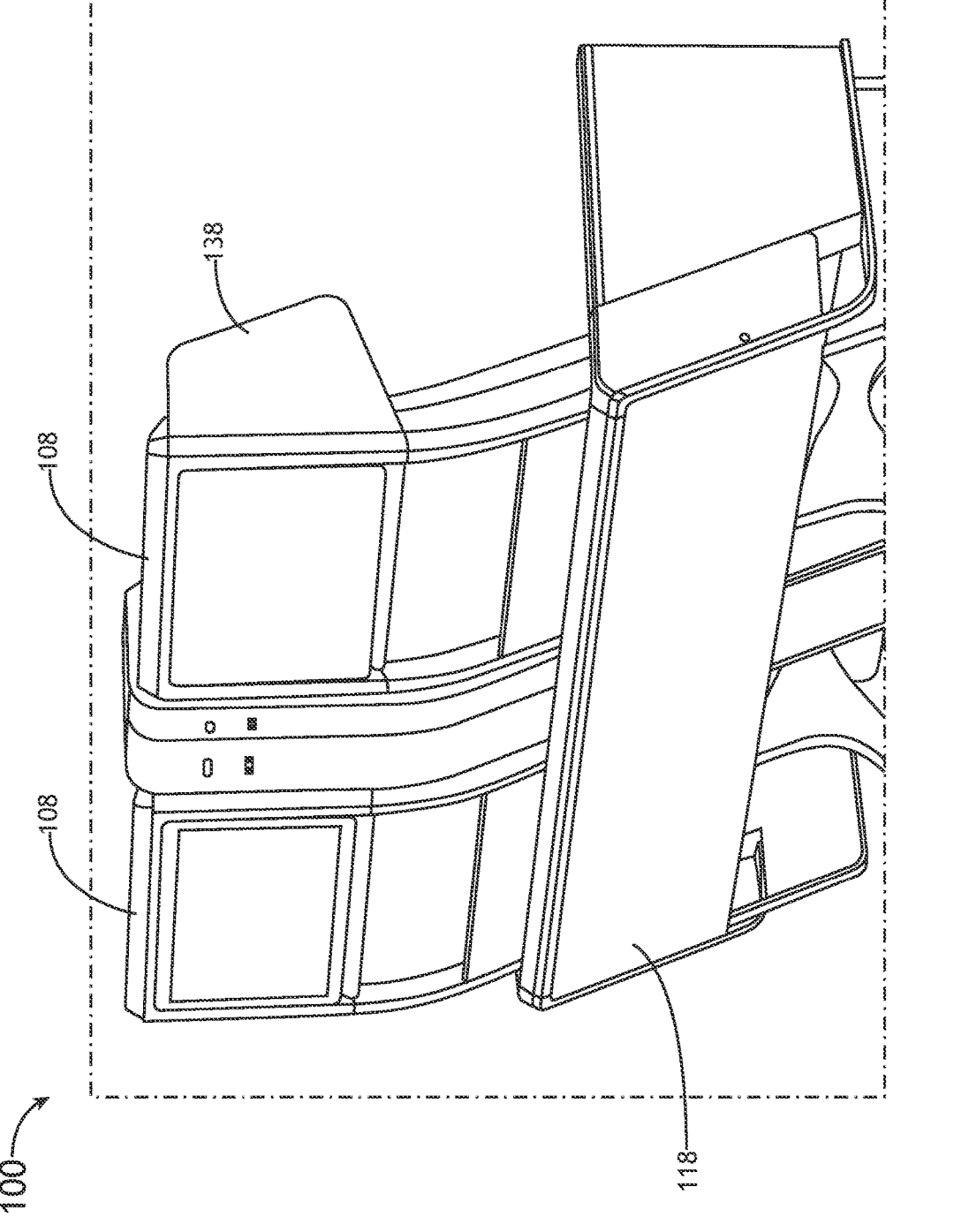
FIG. 5 is a rear perspective view of the passenger seating unit illustrating video monitors and privacy partitions mounted to the seat backs, in accordance with example embodiments of this disclosure.

FIG. 5 illustrates an alternative configuration for the seat backs 108 and the fixed panel 118. As shown, the fixed panel 118 may be flat across the back without any mounted amenities, and each seat back 108 may include a forward extending privacy partition 138 mounted to an upper portion of the seat back 108. In use, the privacy partition extends forward to enhance privacy alongside the seat, e.g., between the seat and the aisle. A privacy partition 138 may be included on each side of the seating unit when the seating unit 100 is positioned between longitudinal aisles, for example, when installed in a center column in a widebody aircraft.

Figure 6:
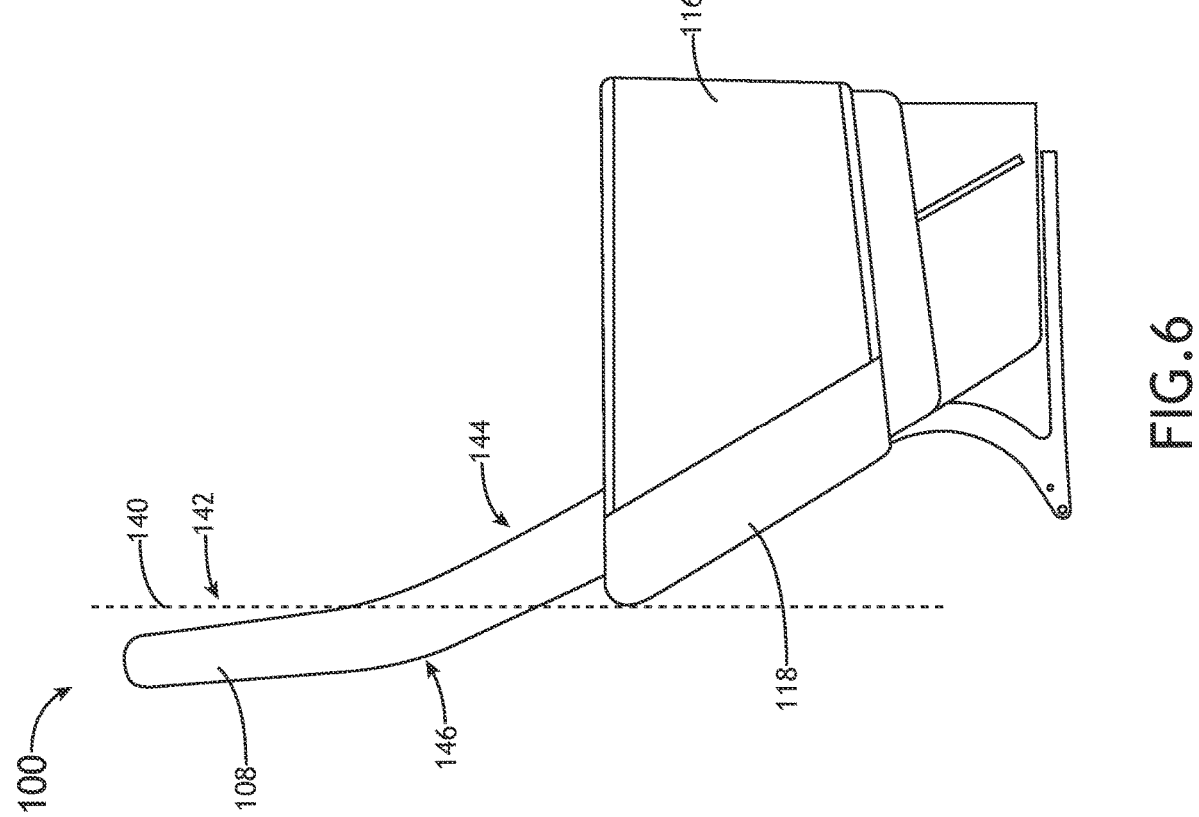
FIG. 6 is a side elevation view of the seating unit illustrating the upright sitting position; in accordance with example embodiments of this disclosure.
Figure 7:
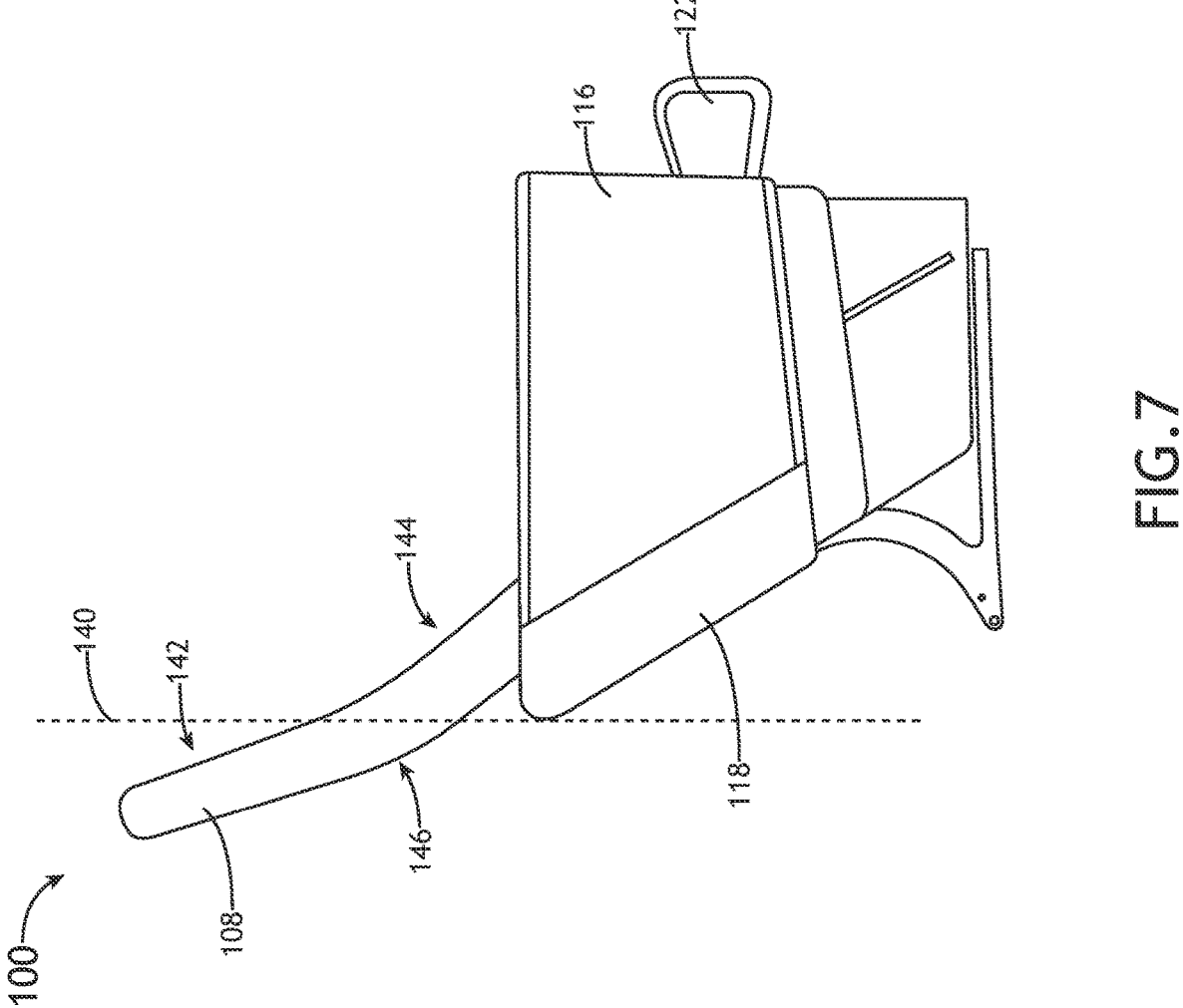
FIG. 7 is a side elevation view of the seating unit illustrating the reclined sitting position, in accordance with example embodiments of this disclosure.

FIGS. 6 and 7 illustrate, respectively, the upright sitting position and the reclined sitting position of a single seat, for instance a single seat assembly or a seat of the seating unit 100. A vertical line 140 drawn about the aft-most point on the fixed shell 118 helps to illustrate the position of the seat back 108 in each of the upright and the reclined sitting positions. In embodiments, the seat back 108 includes an upper portion 142 and a lower portion 144 angled relative to the upper portion 142. As shown, the upper portion 142 is more vertical than the lower portion 144, the fixed shell 118 is inclined, and, when in the upright sitting position, the lower portion 144 and the fixed shell 118 are substantially parallel. In embodiments, a juncture 146 between the upper portion 142 and the lower portion 144 is at all times positioned above a top of the fixed shell 118.

As shown in FIG. 6, when the seat back 108 is in the upright sitting position, the seat back 108 extends rearward of the aft-most point of the fixed shell, and the seat bottom is positioned substantially aligned with the front of the end bay 116. As shown in FIG. 7, when the seat back 108 is in the reclined sitting position, the seat back 108 extends further rearward than when upright, and the seat bottom 122 extends forward beyond the front of the end bay 116. In addition, when the seat transitions from upright to reclined, the seat back lowers and rotates to become less steep to achieve a more comfortable reclined sitting position. In some embodiments, the seat bottom 122 translates forward. In other embodiments, the seat bottom 122 may move forward and rotate to become more inclined to provide a cradle recline sitting position, or less inclined to position the legs of the passenger closer to the floor. The latter configuration may obviate the need for a leg rest. Comparing FIGS. 6 and 7, it is evident that the seat back 108 tracks closely to the fixed shell 118 such that the gap therebetween is minimized and/or maintained substantially constant so as to avoid a pinch point.

Figure 8:
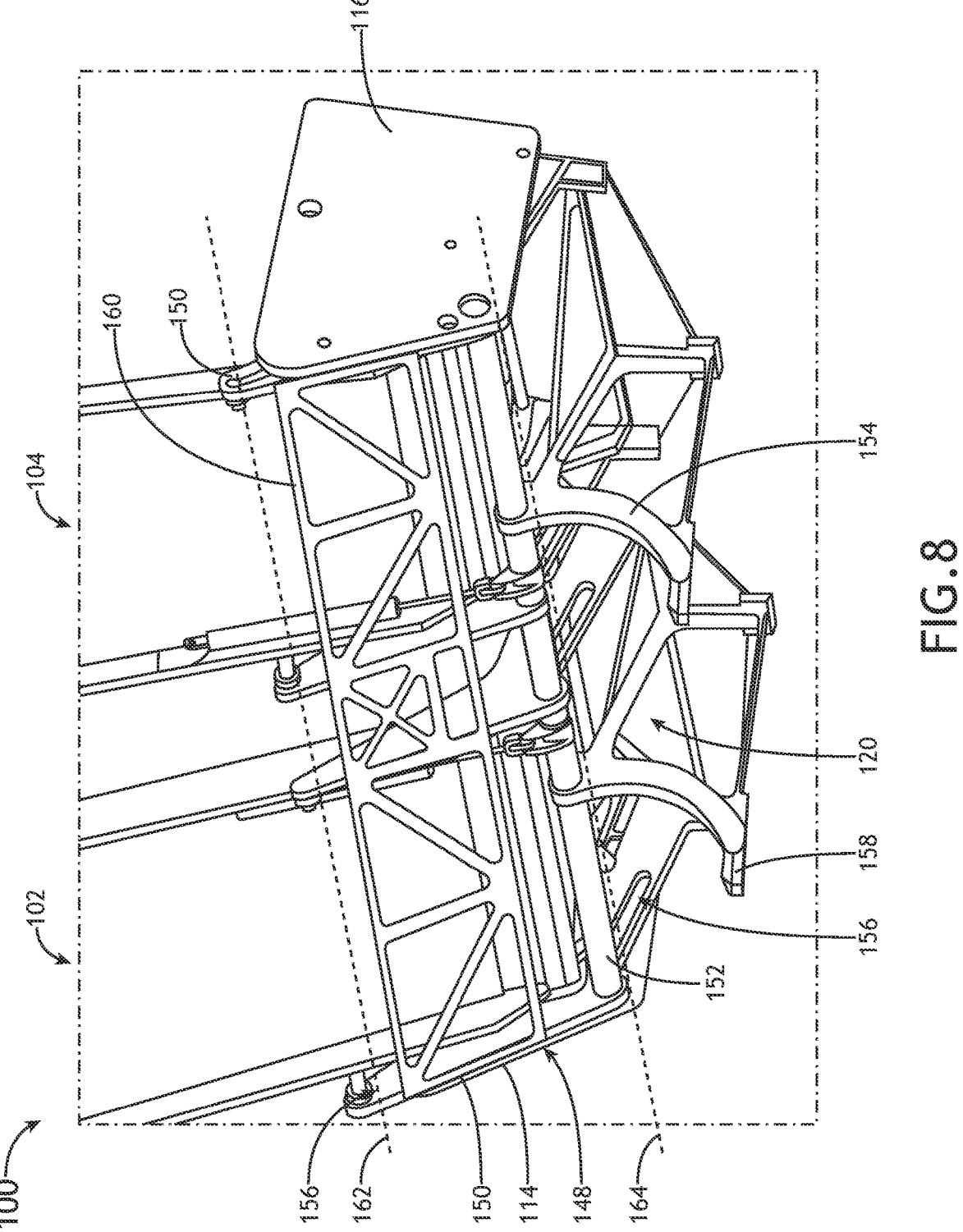
FIG. 8 is a rear perspective view of the passenger seating unit shown with the fixed shell removed to illustrate the underlying frame member and frame assembly.

FIG. 8 illustrates a non-limiting configuration of a frame assembly 148 configured to support the seats 102, 104. In embodiments, the frame assembly 148 generally includes spreaders 150, at least one transverse beam 152, and at least one leg 154. In embodiments, the frame assembly 148 includes a lateral spreaders and middle spreaders, wherein each center spreader is associated with one of the seats 102, 104. In embodiments, the transverse beam 152 may be implemented as a beam tube attached to and extending between the spreaders 150. In a non-limiting example a seat motion mechanism, each spreader 150 may define at least one guideway 156 configured to guide motion of the coupled seat back and seat bottom. Track fasteners 158 may be used to attach the legs 154 to the floor, for instance to seat tracks embedded in the floor of the aircraft.

In embodiments, each spreader 150 may define an upper guideway configured to guide seat back motion, and at least one lower guide configured to guide seat bottom motion. As mentioned above, the upper guideway may cause the seat back to rotate toward horizontal and lower vertically as the seat reclines, and rotate toward vertical and raise vertically as the seat moves toward upright. As stated above, the seat bottom may translate and also rotate. The seat bottom and the seat back are preferably coupled for synchronous motion such that driving one of the seat bottom and the seat back drives the other component. The coupling may be a rotational coupling. As shown, the footwell 120 is positioned under the seats 102, 104, and the legs 154 may demarcate separate footwells for each of the aft passengers, depending on the configurations and spacing of the legs 154.

The fixed shell 118 as discussed above may be part of a fixed shell subassembly further including a frame member 160 attached to the spreaders 150 and extending horizontally across the back of the passenger seating unit 100. As shown, the frame member 160 is elongated and includes linear members and interconnecting cross braces. The upper portions of the spreaders 150 may be inclined. As such, the frame member 160 may be mounted to be inclined. In embodiments, the fixed shell attaches to and overlies the frame member 160 such that the spreaders 150, the transverse beam 152, and the frame member 160 are substantially covered and concealed from view from behind the seat. In this configuration, the fixed shell subassembly prevents the aft passengers from coming into contact with the moving parts of the seats as they recline and move toward upright.

With continued reference to FIG. 8, the frame member 160 may be positioned between an upper transverse plane 162 positioned about at the top of the end bays 114, 116 (e.g., about armrest height), and a lower transverse plane 164 positioned at about the top of the footwell 120, for instance substantially aligned with the transverse beam 152 or aligned with the bottom of the end bays 114, 116.

Figure 9:
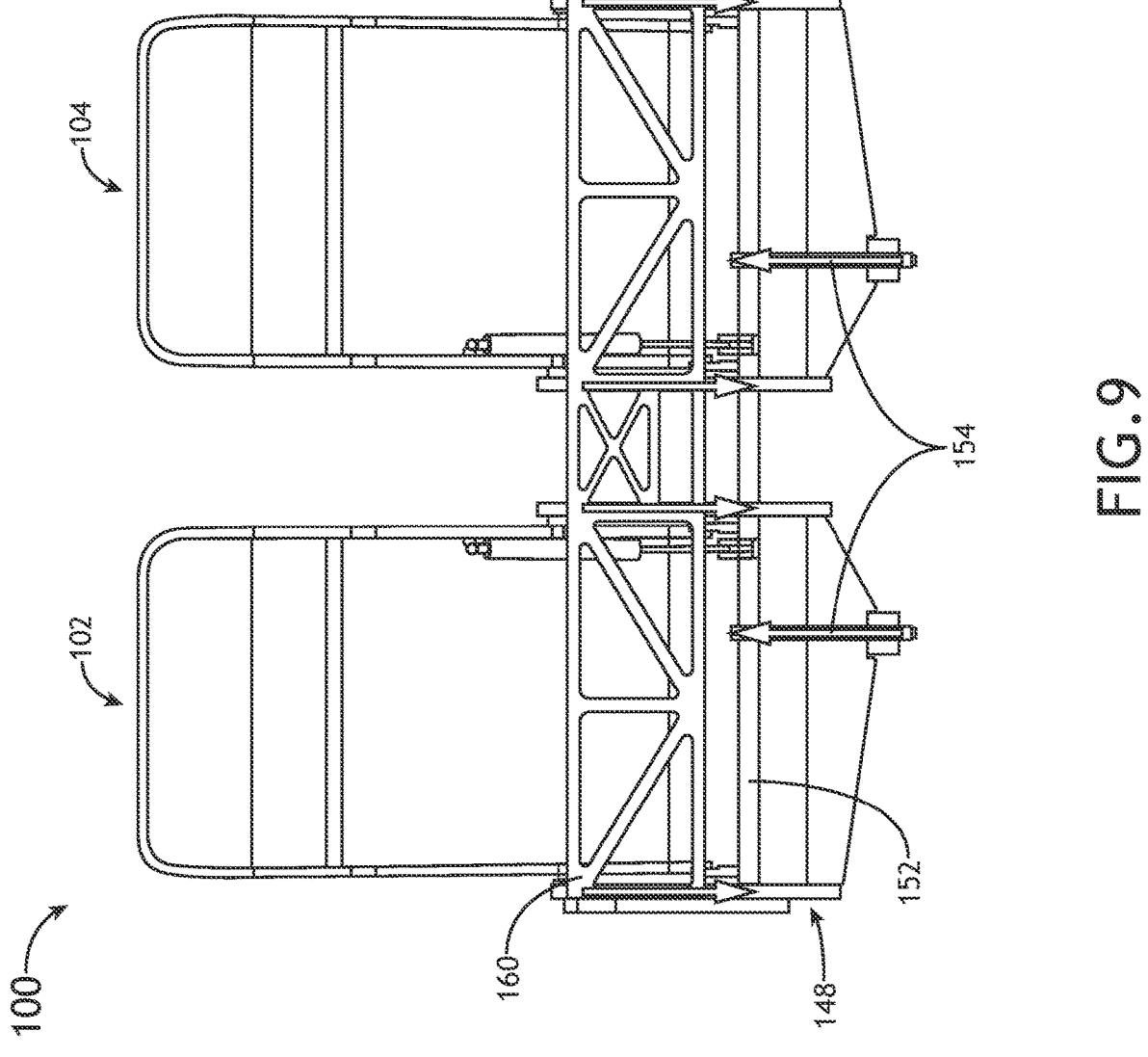
FIG. 9 is a rear view of the seating unit illustrating the distribution of loads through the frame member and the frame assembly.

FIG. 9 further illustrates the configuration of the frame assembly 148 and the frame member 160 of the fixed shell subassembly. In embodiments, the frame member 160 not only functions to mount the fixed shell, but also functions to provide structural rigidity to the seating unit 100. By including the frame member 160 which extends along the length of the seating unit 100, the number of transverse beams 152 and/or interconnections between adjacent spreaders 150 may be reduced. As shown, forces originating from the floor, for instance due to floor warpage during a dynamic event, may be directed upward through the legs 15 to be distributed across the transverse beam 152, whereas forces from the weight of the occupants loading on the seats 102, 104 may be directed downward through the frame member 160 and attached spreaders to be distributed across the transverse beam 152. With this configuration, a lighter weight frame assembly can be achieved as compared to a frame assembly without the frame member 160.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A passenger seat assembly, comprising:
   at least one passenger seat including a seat bottom and a seat back coupled for synchronous motion between an upright sitting position and a reclined sitting position, and the at least one passenger seat including at least one armrest;
   a frame assembly supporting the at least one passenger seat, the frame assembly including spaced lateral spreaders and at least one transverse beam, and the frame assembly defining footwell space below the transverse beam; and
   a fixed shell subassembly, comprising:
      a frame member attached to the spaced lateral spreaders, the frame member extending horizontally across a back of the passenger seat assembly; and
      a fixed shell attached to and overlying the frame member, the fixed shell extending horizontally across the back of the passenger seat assembly, and the fixed shell extending vertically from a position above the footwell space to a position at about armrest height.

2. The passenger seat assembly according to claim 1, further comprising:
   an end bay positioned at each lateral side of the at least one passenger seat; and
   the fixed shell extending vertically between an upper transverse plane substantially aligned with a top of each of the end bays, and a lower transverse plane positioned above the footwell space.

3. The passenger seat assembly according to claim 2, wherein the frame member is positioned below the upper transverse plane and above the lower transverse plane.

4. The passenger seat assembly according to claim 2, wherein the end bays and the fixed shell form a closeout extending substantially continuously across the back and lateral sides of the passenger seat assembly.

5. The passenger seat assembly according to claim 1, wherein:

the seat back includes an upper portion and a lower portion angled relative to the upper portion;

the fixed shell is inclined; and when in the upright sitting position, the lower portion and the fixed shell are substantially parallel.

6. The passenger seat assembly according to claim 5, wherein a juncture of the upper portion and the lower portion is at all times positioned above a top of the fixed shell.

7. The passenger seat assembly according to claim 1, further comprising at least one passenger amenity mounted to a back of the fixed shell for use by a passenger seated in an aft passenger seat facing the fixed shell.

8. A passenger seating unit, comprising:

at least two passenger seats positioned side by side, each passenger seat including a seat bottom and a seat back adjustable between an upright sitting position and a reclined sitting position, and each passenger seat including at least one armrest;

a frame assembly supporting the at least two passenger seats, the frame assembly including spreaders and at least one transverse beam attached to the spreaders, and the frame assembly defining footwell space positioned below the at least one transverse beam; and a fixed shell subassembly, comprising:

a frame member attached to the spreaders, the frame member extending horizontally across a back of the passenger seating unit; and a fixed shell attached to and overlying the frame member, the fixed shell extending horizontally across the back of the passenger seating unit, and the fixed shell extending vertically from a position above the footwell space to a position at about armrest height.

9. The passenger seating unit according to claim 8, further comprising:

an end bay positioned at each lateral side of the passenger seating unit; and the fixed shell extending vertically between an upper transverse plane substantially aligned with a top of each of the end bays, and a lower transverse plane positioned above the footwell space.

10. The passenger seating unit according to claim 9, wherein:

the frame member attaches to a back of the spreaders; and the frame member is positioned below the upper transverse plane and above the lower transverse plane.

11. The passenger seating unit according to claim 9, wherein the end bays and the fixed shell form a closeout extending substantially continuously across the back and lateral sides of the passenger seating unit.

12. The passenger seating unit according to claim 9, wherein each end bay is associated with one of the armrests.

13. The passenger seating unit according to claim 8, wherein:

the seat back includes an upper portion and a lower portion angled relative to the upper portion;

the fixed shell is inclined; and when in the upright sitting position, the lower portion and the fixed shell are substantially parallel.

14. The passenger seating unit according to claim 13, wherein a juncture of the upper portion and the lower portion is at all times positioned above a top of the fixed shell.

15. The passenger seating unit according to claim 8, further comprising at least one passenger amenity mounted to a back of the fixed shell for use by at least one passenger seated in an aft passenger seating unit facing the fixed shell.

16. The passenger seating unit according to claim 8, wherein the seat bottom and the seat back are coupled for synchronous motion wherein, as the passenger seat transitions from the upright sitting position to the reclined sitting position, a pivotal coupling of the seat back and the seat bottom lowers and moves forward.

\* \* \* \* \*